US 12,383,969 B2

(12) United States Patent
Walch et al.

(10) Patent No.: US 12,383,969 B2
(45) Date of Patent: Aug. 12, 2025

(54) PANEL CUTTING MACHINE FOR CUTTING WORK PIECES

(71) Applicant: IMA Schelling Austria GmbH, Schwarzach (AT)

(72) Inventors: Alexander Walch, Bludenz (AT); Achim Rotthowe, Kressbronn (DE); Wolfgang Pöschl, Altach (AT)

(73) Assignee: IMA Schelling Austria GmbH, Schwarzach (AT)

( * ) Notice: Subject to any disclaimer, the term of this patent is extended or adjusted under 35 U.S.C. 154(b) by 471 days.

(21) Appl. No.: 17/540,284

(22) Filed: Dec. 2, 2021

(65) Prior Publication Data

US 2022/0193802 A1 Jun. 23, 2022

(30) Foreign Application Priority Data

Dec. 3, 2020 (EP) ................................ 20211538

(51) Int. Cl.
  *B23D 47/04* (2006.01)
(52) U.S. Cl.
  CPC .................................. *B23D 47/042* (2013.01)
(58) Field of Classification Search
  CPC .... B23D 47/02; B23D 47/042; B23D 59/008; B27B 31/00; B27B 5/065; B27B 5/061; B27B 31/08; B27M 1/08; Y10T 83/462; Y10T 83/0476; Y10T 83/4579; Y10T 83/0448

(Continued)

(56) References Cited

U.S. PATENT DOCUMENTS 2,815,074 A * 12/1957 Dehn .................... B21D 43/287
  83/252
3,522,825 A * 8/1970 Wehner ................... B27B 5/061
  83/110

(Continued)

FOREIGN PATENT DOCUMENTS

AT 372035 8/1983
AT 396766 B 11/1993

(Continued)

OTHER PUBLICATIONS

European Patent Office, Europaischer Recherchenbericht (search in a related application), May 14, 2021.

*Primary Examiner* — Ghassem Alie
(74) *Attorney, Agent, or Firm* — Laurence P. Colton; Smith Tempel Blaha LLC

(57) ABSTRACT

A panel dividing system for sawing workpieces consisting of a panel or a stack of panels, the system having a workpiece support table and a sawing line, a cutting saw movable along the sawing line, and two or more independently movable feed devices for moving the workpieces lying on the workpiece support table, the feed devices each assigned a separate work area in which the workpieces can be moved by the feed devices in a feed direction towards the sawing line, the work areas of the feed devices being formed next to each other on the workpiece support table, and the feed directions of the feed devices run parallel to each other, each feed device being assigned a supply device, each of the supply devices being able to transport at least one of the workpieces into the work area of the feed device to which it is assigned.

17 Claims, 9 Drawing Sheets

(58) Field of Classification Search
USPC .... 83/23, 29, 39, 89, 91, 104.105, 157, 256, 83/272, 404.1, 404.2, 732
See application file for complete search history.

(56) References Cited

U.S. PATENT DOCUMENTS

| | | | |
|---|---|---|---|
| 3,826,164 A | 7/1974 | Campbell | |
| 4,381,686 A | 5/1983 | Ess | |
| 5,007,317 A | 4/1991 | Jenkner | |
| 5,511,500 A * | 4/1996 | Conley, Jr. | D06H 7/02 |
| | | | 112/318 |
| 6,615,100 B1 * | 9/2003 | Urmson | G05B 19/0405 |
| | | | 700/160 |
| 9,126,770 B1 * | 9/2015 | Widder | B65G 61/00 |
| 2015/0239142 A1 * | 8/2015 | Bertram | B26D 7/32 |
| | | | 198/597 |

FOREIGN PATENT DOCUMENTS

| | | | | |
|---|---|---|---|---|
| AT | 402193 B | 2/1997 | | |
| CN | 206230088 U * | 6/2017 | ............. | B27B 25/00 |
| CN | 108453831 A * | 8/2018 | ............. | B27B 25/00 |
| CN | 109500923 A * | 3/2019 | ............. | B27B 31/00 |
| DE | 3248261 A1 | 6/1984 | | |
| DE | 3300351 A1 | 7/1984 | | |
| DE | 3840325 A1 | 7/1984 | | |
| DE | 3911639 A1 | 10/1990 | | |
| DE | 4121517 C1 | 8/1992 | | |
| DE | 19503433 C3 | 8/1998 | | |
| DE | 19930757 A1 | 1/2001 | | |
| DE | 202007010479 U1 | 12/2007 | | |
| DE | 102015206660 A1 | 10/2016 | | |
| DE | 102020001963 A1 * | 9/2021 | ............. | B23Q 41/02 |
| EP | 0424822 A1 | 10/1990 | | |
| EP | 1260328 A2 * | 11/2002 | ............ | B23D 47/042 |
| EP | 1510276 A1 | 3/2005 | | |
| EP | 2147760 A2 | 1/2010 | | |
| EP | 2578370 A1 | 4/2013 | | |
| EP | 2832507 A1 | 2/2015 | | |
| EP | 2422944 B1 | 6/2016 | | |
| EP | 3081343 A1 | 10/2016 | | |
| EP | 3563959 A1 | 11/2019 | | |
| EP | 3733560 A1 | 11/2020 | | |
| EP | 4008507 A1 | 12/2020 | | |
| EP | 4008508 A1 | 12/2020 | | |
| JP | 2008126435 A | 6/2008 | | |
| SE | 428440 B * | 7/1983 | ............. | B27B 5/065 |
| WO | 1999033600 A1 | 7/1999 | | |

* cited by examiner

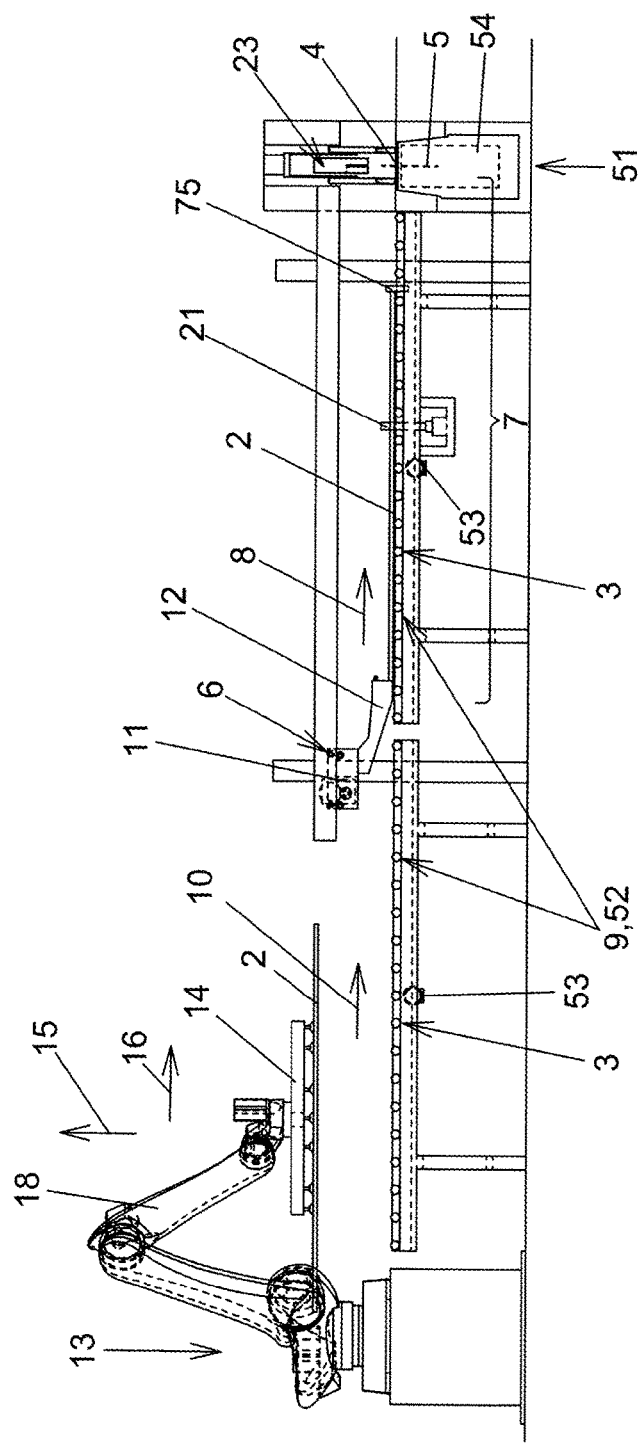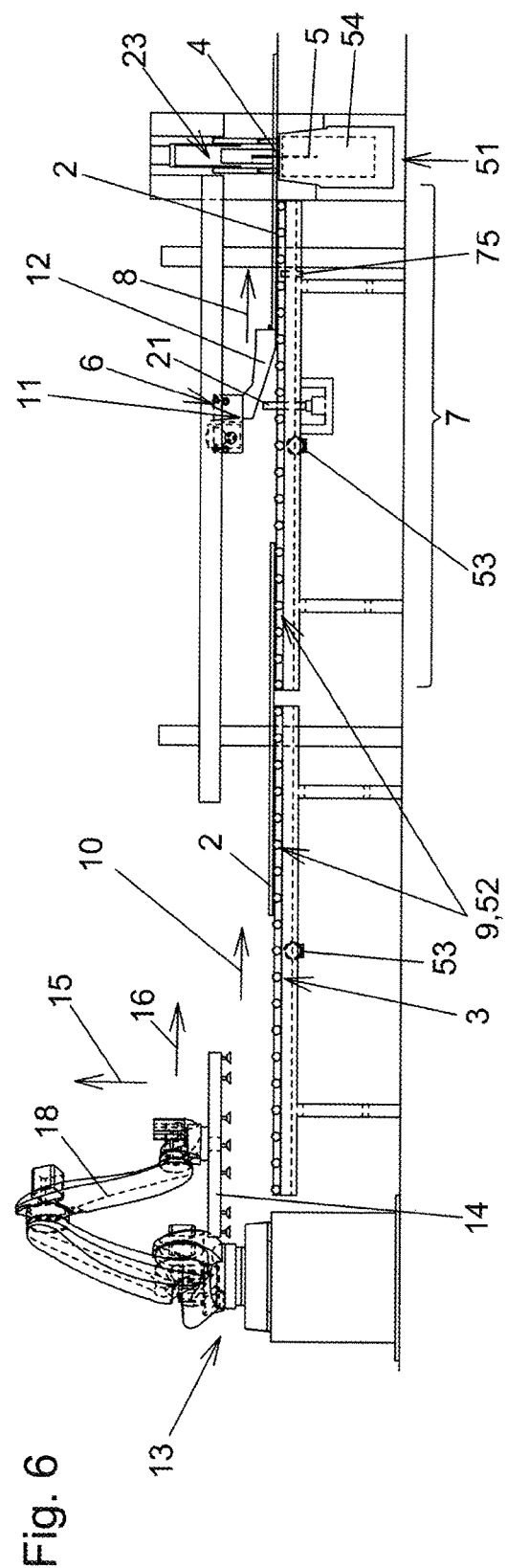

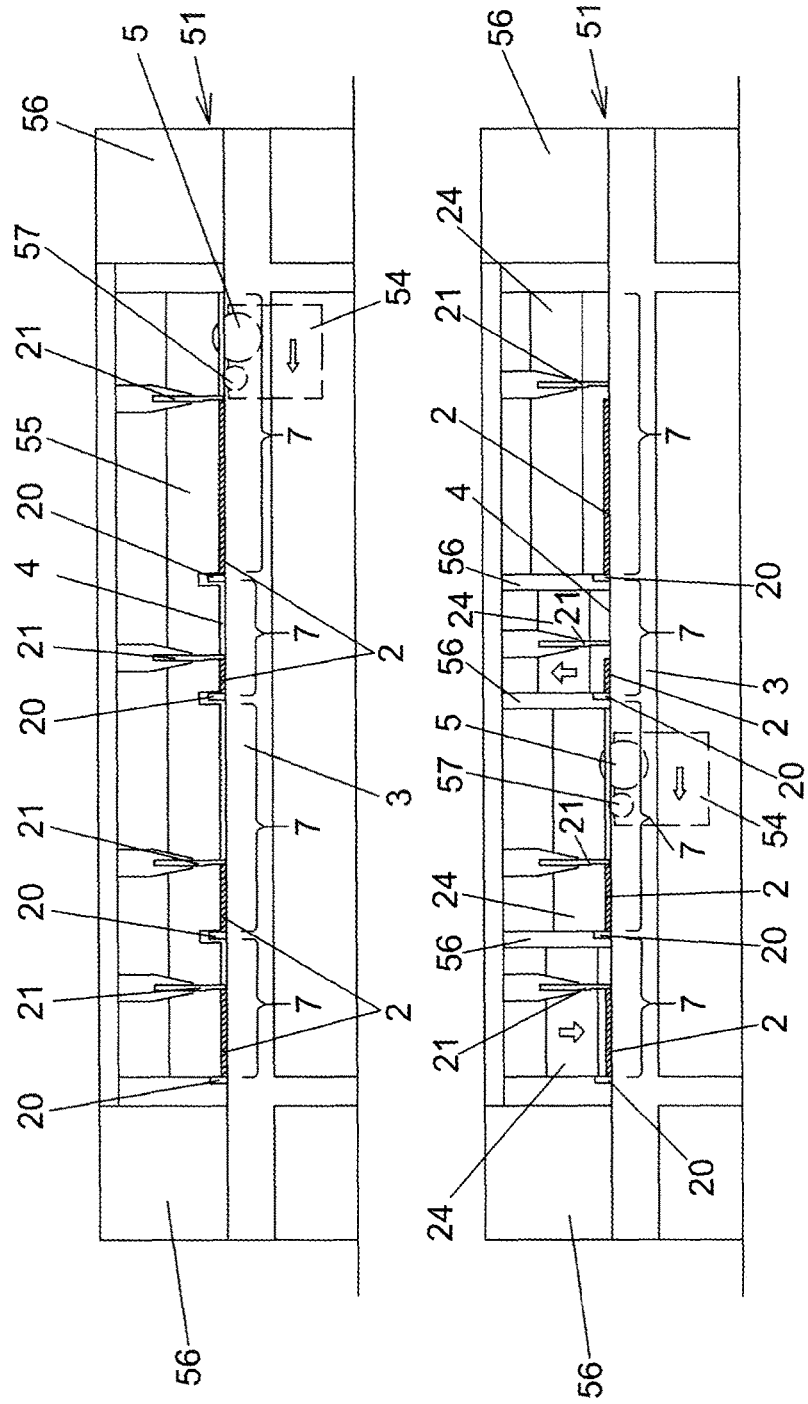

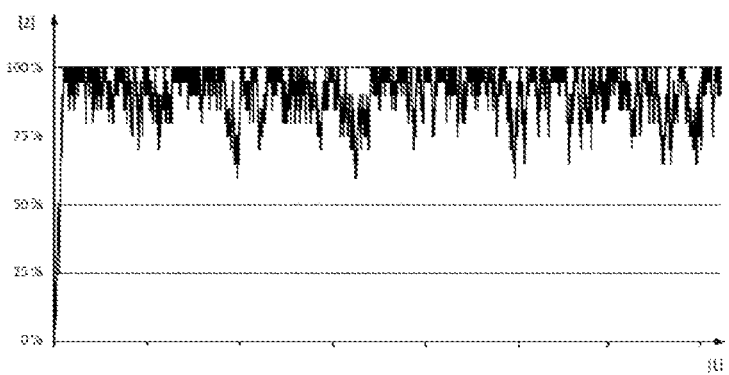
Fig. 16
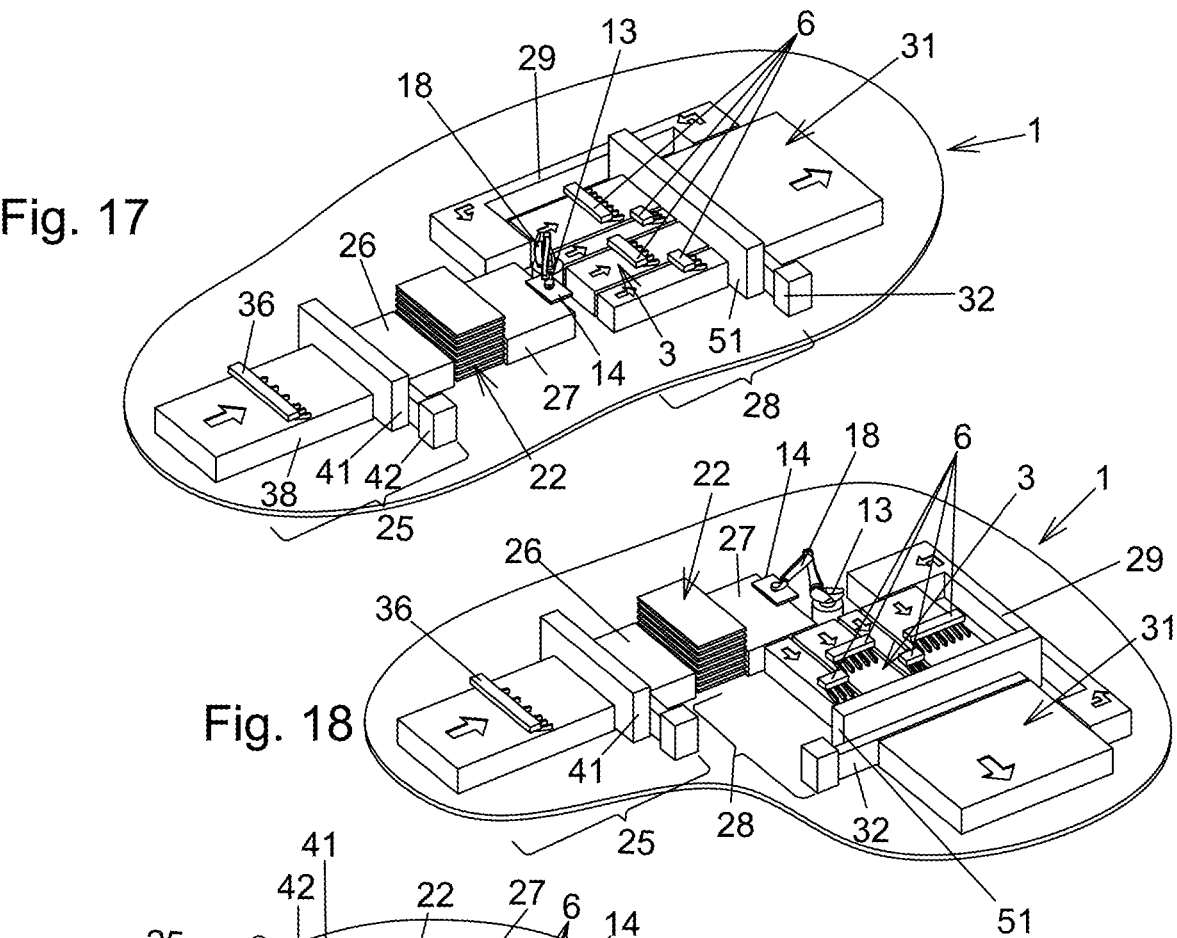
Fig. 17
Fig. 18
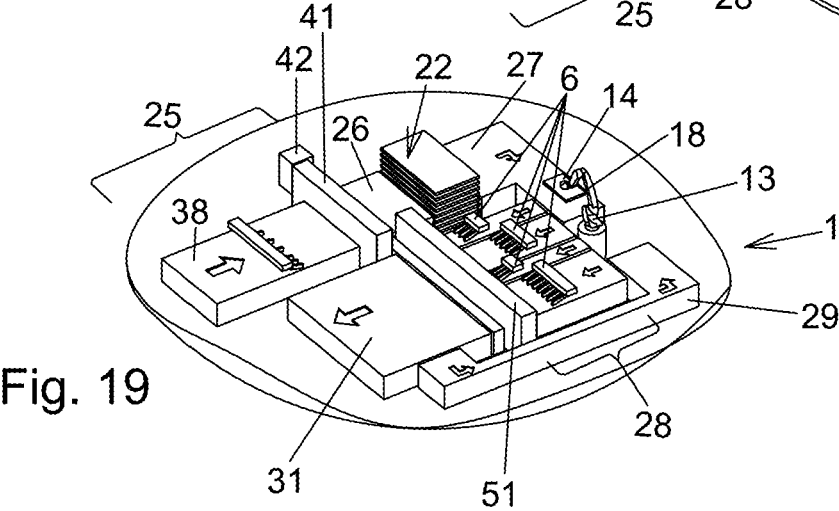
Fig. 19

PANEL CUTTING MACHINE FOR CUTTING WORK PIECES

CROSS REFERENCE TO RELATED APPLICATIONS

This application claims the benefit of and priority on European Patent Application No. 20 211 538.2 having a filing date of 3 Dec. 2020.

BACKGROUND OF THE INVENTION

Technical Field

The present invention relates to a panel dividing system for sawing workpieces consisting of a panel or a stack of panels, the panel dividing system having a workpiece support table and a sawing line, having a cutting saw which is movable along the sawing line, and having two or more independently movable feed devices for moving the workpieces lying on the workpiece support table, the feed devices each being assigned a separate work area in which the respective workpiece can be moved by the respective feed device in a respective feed direction towards the sawing line, wherein the work areas of the feed devices are formed next to each other on the workpiece support table, and the feed directions of the feed devices run parallel to each other.

Prior Art

A generic panel dividing system is known, for example, from DE 32 48 261 A1. In this document, several feed devices working in parallel are connected upstream of one of the sawing lines in order to utilize the panel-dividing system as well as possible, and to operate it in an optimized manner. The disadvantage of the technology disclosed in DE 32 48 261 A1 is that the workpieces have to be supplied to the different feed devices by passing through the work areas of the other feed devices. This means that the feed devices of the generic panel dividing system can only work independently of each other, and are temporarily blocked when new workpieces have to be supplied to other feed devices.

BRIEF SUMMARY OF THE INVENTION

The object of the invention is to further improve panel dividing systems of the type mentioned above with regard to their productivity.

To this end, the invention proposes a panel dividing system for sawing workpieces consisting of a panel or a stack of panels, the panel dividing system having a workpiece support table and a sawing line, having a cutting saw which is movable along the sawing line, and having two or more independently movable feed devices for moving the workpieces lying on the workpiece support table, the feed devices each being assigned a separate work area in which the respective workpiece can be moved by the respective feed device in a respective feed direction towards the sawing line, wherein the work areas of the feed devices are formed next to each other on the workpiece support table, and the feed directions of the feed devices run parallel to each other, characterized in that each feed device is assigned a supply device of the panel dividing system, each of the supply devices being able to transport at least one of the workpieces into the work area of the feed device to which it is assigned.

As such, each feed device according to the invention is assigned a supply device of the panel dividing system, wherein each of the supply devices is able to transport at least one of the workpieces into the work area of the assigned feed device.

A fundamental idea is therefore that the panel dividing system additionally has a supply device for each feed device, with which new workpieces can be supplied to the respective feed devices. This manner of supplying new workpieces enables the feed devices to convey workpieces for sawing to the sawing line without being disturbed by the supply of new workpieces to other feed devices. This means that the maximum possible number of workpieces can always be sawn at the same time along the sawing line. In contrast to the prior art, the invention no longer blocks individual feed devices when new workpieces have to be supplied through their work area to another feed device. Because each feed device is assigned its own supply device, the new workpieces can be supplied by the supply devices of the respective feed devices regardless of the operating state of the feed devices working in parallel. As a result, the feed devices, with their work areas formed next to each other on the workpiece support table, can be operated completely independently of each other. New workpieces can already be supplied to the work area of the feed devices, by means of the supply devices assigned to them, when the given feed device is still busy feeding the previous workpiece to the sawing line. The supply devices therefore ensure that the feed devices to which they are assigned experience the least possible idle time, or no idle time at all. One could also say that each supply device lays the groundwork for the feed device to which it is assigned.

The work areas of the respective feed devices are the areas on the workpiece support table to which each feed device can push workpieces in their respective feed directions towards the sawing line, and also can pull them away from the sawing line in a direction opposite the feed directions. The work areas of the various feed devices arranged next to each other on the workpiece support table can in principle overlap each other. Preferred variants of the invention, however, provide for the maximum possible independence of the feed devices from each other, such that the work areas of the feed devices arranged next to each other are designed separately from each other. In other words, they do not overlap or—in other words still—are arranged next to each other without overlap. This can be achieved, for example, in that a stop rail is arranged at least in some regions between two mutually adjacent work areas. As is known per se, the stop rails can then also be used to align the workpiece in the given work area. In this sense, it is then preferably provided that at least one of the work areas, and preferably all of the work areas, are assigned an alignment device of the panel dividing system for aligning the respective workpieces, preferably in a direction parallel and/or orthogonal to the given feed direction. The alignment devices and the stop rails can work together in a manner known per se.

The cutting saw is moved along the sawing line in order to saw the workpieces. It is preferably provided that the cutting saw is arranged in a saw carriage by means of which it can be moved along the sawing line. The cutting saw can, for example, have a rotating circular saw blade, or be formed therefrom. A scoring saw blade can be arranged in front of it. In the saw carriage, the cutting saw and/or its saw blade can advantageously be lowered and raised above the given support plane of the workpiece support table in the region of the sawing line.

With the feed devices, the workpieces are transported to the sawing line in their respective work areas for the sawing process. This transport to the sawing line takes place in the respective feed directions of the respective feed devices. However, the feed devices can preferably, if necessary, also push and/or transport the workpieces in a direction opposite the feed direction—that is to say, away from the sawing line. It is particularly preferably provided that each of the feed devices has a carrier which runs orthogonally to its feed direction and which is displaceable in its feed direction, with at least one gripper for gripping one of the workpieces, which gripper can be raised and lowered. Each carrier preferably has a plurality of grippers. The respective carriers and grippers are advantageously arranged above the workpiece support table, and can be moved above the workpiece support table in the feed direction and opposite the feed direction, the feed devices being able to perform this movement independently of each other. The feed devices are advantageously designed in such a manner that workpieces can be transported past them underneath, at least when the grippers are raised, for example when the assigned supply devices transport a new workpiece into the work area of the given feed device.

In principle, it would also be possible for the supply devices to each have a carrier with grippers arranged thereon—that is to say, to be designed in a manner similar to the feed devices. Preferred variants of the invention, however, provide that the supply devices are each designed as driven conveyor tracks, on each of which at least one of the workpieces can be transported in a lying position. Driven conveyor tracks are known per se in panel dividing systems. These can be, for example, driven roller conveyors, conveyor belts, or the like.

In order to be able to operate the feed devices as independently of each other as possible, preferred variants provide that each of the work areas of the feed devices is formed between the sawing line and the supply device assigned to the respective feed device. In simple terms, it is therefore advantageously provided that each supply device is arranged, so to speak, opposite the sawing line on the side of the work area of the feed device to which it is assigned. Supply devices can, so to speak, feed workpieces from behind into the respective work areas of the respective feed devices, such that the feed devices working in adjacent work areas are not disturbed.

It is preferably also provided that each of the supply devices can transport at least one of the workpieces in a transport direction of the respective supply devices into the work area of the assigned feed device, and the respective transport directions of the supply devices run parallel to the feed directions of the feed devices.

The term 'workpiece' is to be understood in a general way. It can be either a single panel or a stack of panels. Workpieces can be completely unprocessed panels, or stacks of such completely unprocessed panels. However, the workpieces can also be panels or stacks of panels that have already been processed, that is to say, for example, partially sawn and/or trimmed. Particularly preferably, it is even provided that the panel dividing system has at least one upstream processing station for sawing and/or trimming the workpieces before they are fed to the supply devices. In this case, the workpieces are workpieces which have already been sawn and/or trimmed at least once in the upstream processing station before they are transported by the respective supply devices into the respective work areas of the feed devices. It is particularly preferred if the workpieces have already been trimmed. It is particularly favorable if their already-trimmed ends point in the direction of the sawing line when they are introduced by the respective supply devices into the respective work areas of the respective feed devices.

Preferred variants of the invention provide that the panel dividing system has a lifting device for feeding the respective workpieces to the respective supply devices from above, and for depositing the respective workpieces at, preferably on, the respective supply devices. In other words, it is preferably provided that the workpieces can be lifted into the respective areas of the respective supply devices by means of the lifting device. Favorable variants provide that the lifting device has a workpiece holding device for holding the workpieces, which can be moved in the vertical spatial direction and in one or two horizontal spatial directions. For such lifting devices, various variants are known per se in the prior art, and also in panel dividing systems. By way of example, it can be provided that the lifting device has a robot arm which can be moved in the spatial directions, and on which the workpiece holding device is arranged. Other variants can provide that the lifting device has a gantry crane with which the workpiece holding device can be moved in the spatial directions. Corresponding workpiece holding devices are known per se in the prior art. It can be provided, for example, that the workpiece holding devices have one or more suction bells to which the workpieces can be attached by means of suction. However, workpiece holding devices known per se can also be used—with which, in particular, several panels stacked on top of each other can be gripped from the side. In any case, favorable variants provide that the workpieces can also be rotated with the lifting device about a, preferably vertical, axis, and/or, in other words, that the lifting device also has a rotating device for rotating the workpieces attached to the workpiece holding device. The workpiece holding device is usually rotated together with the workpieces.

In order to always have available a sufficient number of workpieces which have not yet been processed, so as to achieve the best possible utilization of the sawing line, wherein these workpieces can be transported into the work areas of the feed devices by means of the supply devices assigned to them, in preferred variants of the panel dividing system, it has a storage device for storing the workpieces. The workpieces can be removed, preferably by the lifting device, from this storage device. In the interests of maximum flexibility, it is expediently provided that the storage device has a sorting function, on the basis of which the workpieces can be removed from the storage device, preferably by means of the lifting device, regardless of the order in which they are stored. Such storage device with a sorting function are known per se. By way of example, it can be provided that the storage device has several storage levels arranged one above the other, in which the workpieces can be stored by a stocking device of the storage device, and from which the workpieces can be removed by a removal device of the storage device.

As is known per se, the sawing line is advantageously assigned a pressure beam device with which the workpieces lying in the various work areas can be pressed against the workpiece support table during the sawing process. The pressure beam device can have a single pressure beam extending over the entire sawing line. However, preferred variants provide that the sawing line is assigned a pressure beam device with several pressure beam segments that can be operated independently of each other and each assigned to one or more of the work areas for pressing at least one of the workpieces onto the workpiece support table.

In addition, it should be pointed out that panel dividing systems according to the invention can also have a different number of cutting saws that can be moved along the sawing line. It can certainly be provided that only a single cutting saw can be moved along the sawing line in order to saw all of the workpieces lying in the work areas of the feed device with this single cutting saw. In the interests of greater flexibility, however, provision can also be made for the panel dividing system to have two or more cutting saws, which can be moved, preferably in an uncoupled manner, along the sawing line. In this case, several cutting saws can be moved along the same sawing line. These are advantageously not coupled, that is to say not coupled to each other, but rather can be operated independently of each other as required.

Preferred variants of the panel dividing system according to the invention provide that the panel dividing system has a return device for returning workpieces from an area behind the sawing line into an area in front of the sawing line. Such return devices are known per se. These may be conveyor tracks leading around the sawing line on which the workpieces are transported lying horizontally. They may also be lifting devices with which the workpieces are lifted over the sawing line. In particular, if there is a lack of space, however, they may also be conveyor tracks in which the workpieces are transported in an inclined position.

In addition to the panel dividing system itself, the invention also relates to a method for operating a panel dividing system according to the invention. This method is characterized in that the workpieces are supplied independently of each other by means of each supply device to the work area of the feed device assigned the given supply device. The workpieces are preferably supplied into the work area by means of the supply device, while a different workpiece is supplied by the given feed device to the sawing line for sawing. Therefore, new workpieces are advantageously supplied by means of the supply devices into the work areas of the respective feed devices when the previous workpiece is still being supplied to the sawing line by the assigned feed device. With the method according to the invention, the most optimal possible utilization of the panel dividing system, in particular in the region of the sawing line, can be achieved. In this sense, it is also advantageous if, during each sawing process, workpieces are present along the sawing line in all work areas, and are sawn during this sawing process.

BRIEF DESCRIPTION OF THE DRAWINGS

Further features and details of preferred embodiments of the invention are explained by way of example in the following description of the figures, wherein:

FIGS. 5 and 6 are side views of the region of the panel dividing system from FIGS. 1 to 4, in which the core ideas essential to the invention are implemented;

FIGS. 7 to 9 are illustrations of different design variants of how the panel dividing system from FIGS. 1 to 4 can be designed in the region of the sawing line;

FIG. 16 shows a representation of the degree of filling of the storage device as a function of time; and FIGS. 17 to 22 are highly schematic illustrations of various embodiments of panel dividing systems according to the invention.

DETAILED DESCRIPTION OF PREFERRED EMBODIMENTS

Figure 1:
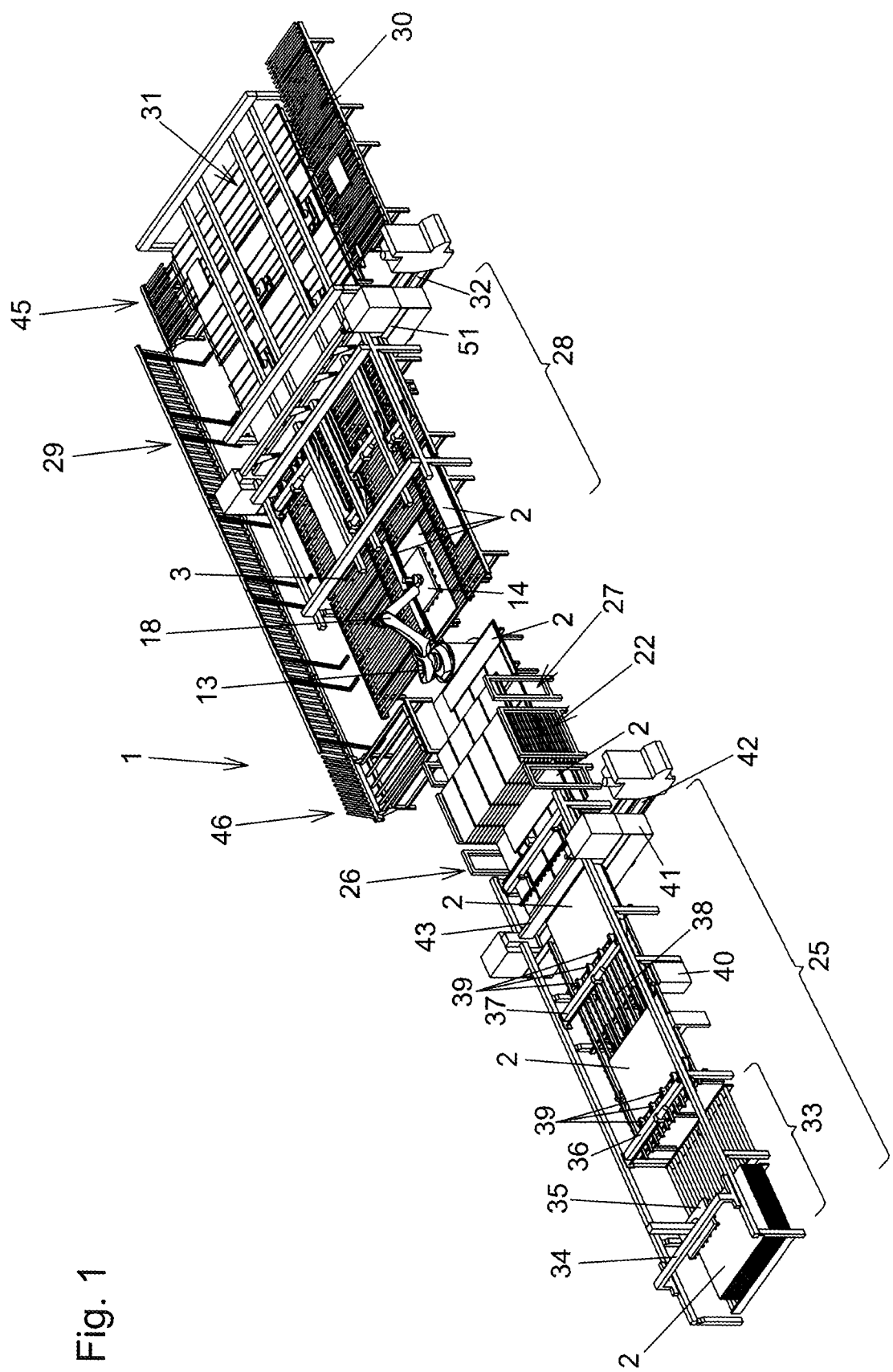
FIG. 1 is a perspective view of an embodiment of a panel dividing system in which the invention is implemented.
Figure 2:
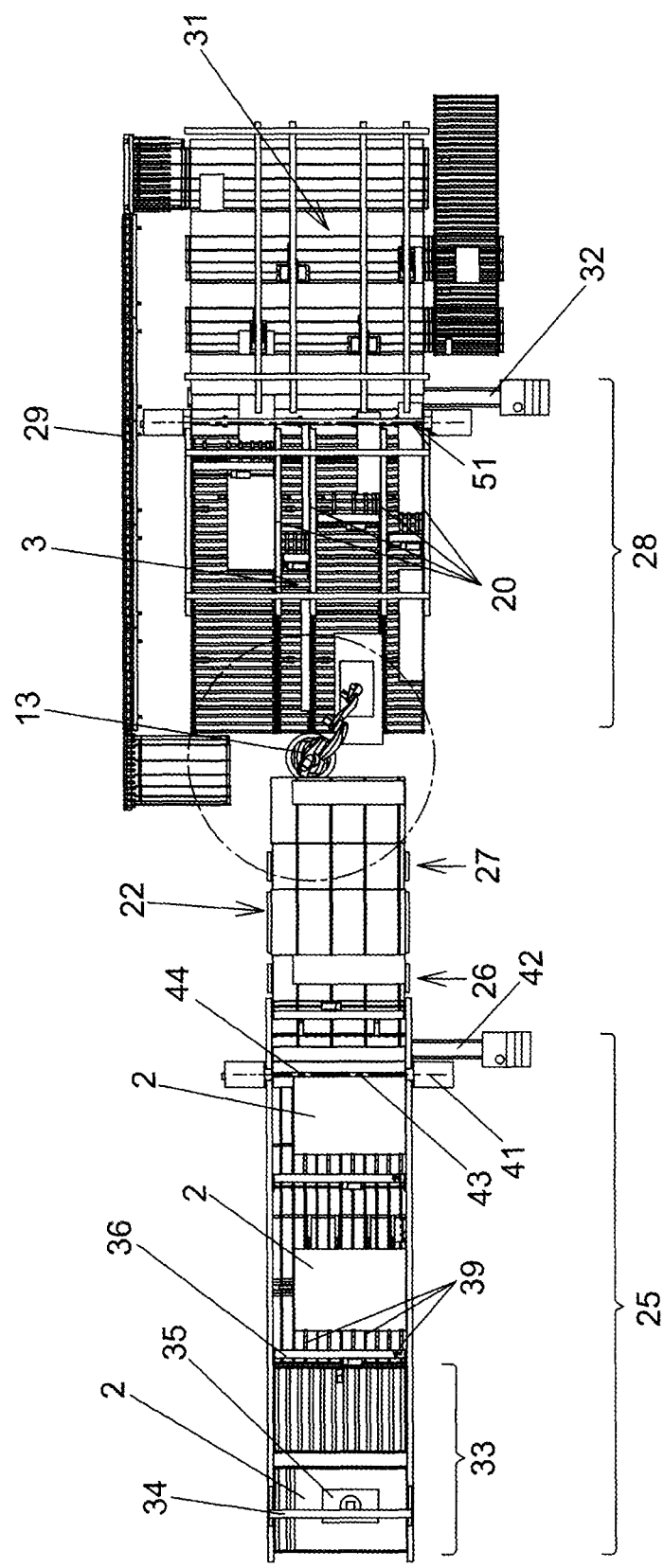
FIG. 2 is a plan view of the panel dividing system according to FIG. 1.

FIGS. 1 and 2 show the panel dividing system 1 of this embodiment as a whole. It has an upstream processing station 25 and a processing station 28. As described in detail below, essential core ideas of the invention are implemented in the processing station 28. Between the two processing stations 25 and 28 is a storage device 22 with a stocking device 26 and a removal device 27 for the workpieces 2. Between the storage device 22 and the processing station 28, there is a lifting device 13. Behind the processing station 28 is a sorting station 31 with a discharge area 30. A return device 29 leads around the sawing line 4 of the processing station 28.

The mode of operation of the upstream processing station 25 shown here by way of example will first be explained with reference to FIGS. 1 and 2. With it, workpieces 2 can be sawn as well as trimmed. The processing station 25 has a workpiece buffer 33, known per se, in which workpieces 2 that have already been processed or that have not yet been processed can be stored. With the lifting device 34 embodied in this case as a gantry crane and its workpiece holding device 35, the workpieces 2 can be picked up from the workpiece buffer 33 and transported to the workpiece support table 38, and deposited there. Of course, the workpiece buffer 33 and the supply of the workpieces 2 to the workpiece support table 38 could also be implemented differently than in this case, in other variants known per se in the prior art. The lifting device 34 is advantageously designed in such a manner that it can rotate the workpiece holding device 35 together with the workpiece attached to it about a vertical axis.

As is known per se, alignment devices and stop rails for aligning the workpiece 2 can be integrated into the workpiece support table 38. Rotation devices for rotating the workpieces 38 lying on the workpiece support table 2 can likewise be integrated into the workpiece support table 38, although this is not shown in detail here. One or more feed devices 36, 37 can be provided to transport the workpieces 2 lying on the workpiece support table 38. In the present example shown in FIG. 1, there is a first feed device 36 and a second feed device 37, which can each be displaced towards and away from the sawing station 41 in order to convey the workpieces 2 towards the sawing station 41 and, if necessary, away from it again. Both feed devices 36 and 37 have grippers 39 in order to grip the workpiece 2 lying on the workpiece support table 38. The grippers 39 are advantageously designed so that they can be raised and lowered above the workpiece support table 38. The use of two feed devices 36 and 37 in front of a sawing station 41 has the advantage that the rear feed device, that is, in this case the first feed device 36, can feed new workpieces 2 already while the previous workpiece 2, which is still clamped to the second feed device 37, continues to be sawn along the sawing line 44 formed in the sawing station 41. The sawing station 41, shown here only schematically, has a pressure beam 43 with which the workpieces 2 can be pressed onto the sawing line 44 and/or onto the workpiece support table 38 during the sawing process, in order to produce a clean cut. A cutting saw is expediently present along the sawing line 44, for example in a saw carriage, and can be moved along the sawing line 44 to carry out the sawing processes. This cutting saw can advantageously be raised above the support plane of the workpiece support table 38 and lowered below it. All of this is known per se and does not need to be explained further. The cutting saw of the sawing station 41, which can be moved along the sawing line 44, can in any case be designed essentially in the same way as the cutting saw 5 of the processing station 28, which can be moved along the sawing line 4. The latter is explained further below with reference to FIGS. 5 and 6, by way of example.

Upstream of the sawing station 41, the processing station 25 has a trimming station 40 in a preferred embodiment such as that shown here. This makes it possible for workpieces 2 to be trimmed on their way to the sawing station 41. The workpiece 2 can be pushed past the trimming station 37 by means of one of the feed devices 40 and 36. In contrast to the embodiment shown here, however, it is also conceivable that the workpiece 2 is held stationary during the trimming process, and the trimming station 40 has a trimming tool which is then moved along the workpiece 2 in order to remove the edge. Saw blades, such as circular saw blades, and also milling heads or the like, can both be used as trimming tools of the trimming station 40.

In the embodiment shown here, a waste disposal device 42 is positioned after the sawing station 41, by means of which waste produced during the sawing processes in the sawing station 41 and which is not further processed can be disposed of. Such waste disposal devices 42 are also known per se and do not need to be explained further.

If, as implemented in the embodiment shown here, there are two feed devices 36 and 37, this enables a very effective method for operating the processing station 25, and thus also the entire panel dividing system 1. The second feed device 37 is driven in the direction of the saw station 41, and its grippers 39 are raised. The first feed device 36 can then move a workpiece 44 to the sawing station 37 and thus also to the sawing line 2 under the second feed device 41, far enough that the workpiece 2 is pressed onto the workpiece support table 38 by the lowering of the pressure beam 43, and the first sawing process can be performed by moving the cutting saw along the sawing line 44. While the workpiece 2 is pressed onto the workpiece support table 38 by means of the pressure beam 43, the first feed device 36 can be detached from this workpiece 2 and moved back, away from the sawing station 41, in order to grasp another workpiece 2 with its grippers 39. The second feed device 37 can then grip the workpiece 2 currently positioned at the sawing station 41 with its grippers 39, in order to continue the process of sawing the workpiece 2 on the sawing line 44 in a manner known per se. The second feed device 36 does not necessarily have to subsequently take the workpiece 2, which has just been pressed against the workpiece support table 38 by the pressure beam 37, from the first feed device 43 during the first sawing operation on this workpiece 2 along the sawing line 44. Rather, this transfer can take place during a later sawing operation performed on this workpiece 2 along the sawing line 44.

On the way to the sawing station 41, in preferred variants, a trimming process can then also be carried out with the trimming station 40.

In the embodiment of a panel dividing system 1 shown in FIGS. 1 and 2, the workpieces 2 which were created by the sawing at the sawing station 41 and do not form any waste are stored in the storage device 22 arranged downstream. In principle, a great variety of storage devices known per se can be used in this case. The storage device 22 shown here, like other preferred variants, has a sorting function. This allows the workpieces 2 stored in the storage device 22 to be removed from the storage device 22 again regardless of the order in which they were stored. Specifically, this is achieved in this case in that the storage device 22 has several levels, in each of which workpieces 2 can be stored. The workpieces 2 are stored using a stocking device 26 which is suitable for stocking the workpieces 2 coming from the sawing station 41 on different levels of the storage device 22. Downstream of the storage device 22, there is a removal device 27 which is suitable for removing workpieces 2 stored there from different levels of the storage device 22. In this way, the sorting function can be implemented, such that the workpieces 2 do not necessarily have to be removed from the storage unit 22 in the order in which they were stocked. Of course, the storage device 22 with and/or without a sorting function could also be designed differently, as is known per se in the prior art.

In this embodiment, the core ideas of the invention are implemented in the processing station 28 of the panel dividing system 1. This is described in more detail below with reference to FIGS. 3 and 4.

The processing station 28 and thus the panel dividing system 1 has the workpiece support table 3 and a cutting saw 5 that can be moved along the sawing line 4. The sawing line 4 is arranged in the sawing station 51. The sawing station 51 is shown in more detail in FIGS. 5 and 6. In this embodiment, four feed devices 6 are provided above the workpiece support table 3. With these, workpieces 2 can be pushed, lying on the workpiece support table 3, in the feed direction 8 towards the sawing line 4, so that the workpieces 2 are accordingly arranged on the sawing line 4 for the cutting. If necessary, the feed devices 6 can also pull the workpieces 2 back in the direction opposite their respective feed directions 8. The feed devices 6 each have a carrier 8 which can be moved in the feed direction 11 and also counter to the feed direction 8, and on which grippers 12 known per se are provided for gripping the workpiece 2. The grippers 12 can each be lowered to the workpiece support table 3, and can also be raised relative to it. The feed devices 6 can be operated independently of each other. The feed directions 8 are advantageously aligned parallel to each other, as is also the case in this embodiment. Each feed device 6 has its own work area 7 on the workpiece support table 3. These work areas 7 are arranged next to each other. In principle, it is conceivable that they overlap. In preferred embodiments, such as the one shown here, they are, however, separated from each other. In the present embodiment, the delimitation takes place by means of the stop rails 20. The workpieces 2 can also be aligned in the respective work areas 7 by means of the stop rails 20 and the respective alignment devices 21.

According to the invention, each feed device 6 in this embodiment is assigned a supply device 9 of the panel dividing system 1. With each of the supply devices 9, workpieces 2 can be transported into the respective work areas 7 of the associated feed device 6. It can be seen in FIG. 4 in particular that the respective work areas 7 of the respective feed devices 6 are each formed between the sawing line 4 and the supply device 9 assigned to the respective feed devices 6. The transport directions 10 of the respective feed devices 9, in which the workpieces 2 can be transported by the respective supply devices 9 into the respective work areas 7 of the associated feed devices 6, are, as can be clearly seen in FIG. 4, arranged parallel to the feed directions 8 of the feed devices 6 In the embodiment shown here, the supply devices 9 are each designed as driven conveyor tracks 52—in this case, specifically as driven roller tracks. Such conveyor tracks 52 and/or roller tracks are known per se in the prior art. At least one of the workpieces 2 can be transported lying on them. However, it should also be pointed out that, as an alternative to the embodiment shown here, the supply devices 9, like the feed devices 6, could be designed with corresponding carriers and grippers arranged thereon above the workpiece support table 3. It would even be conceivable to design the feed devices 6 as corresponding conveyor tracks and/or roller tracks.

What is important is that the feed devices 6 can be operated independently of each other. It is also expedient if the supply devices 9 can also be operated independently of each other.

Figure 4:
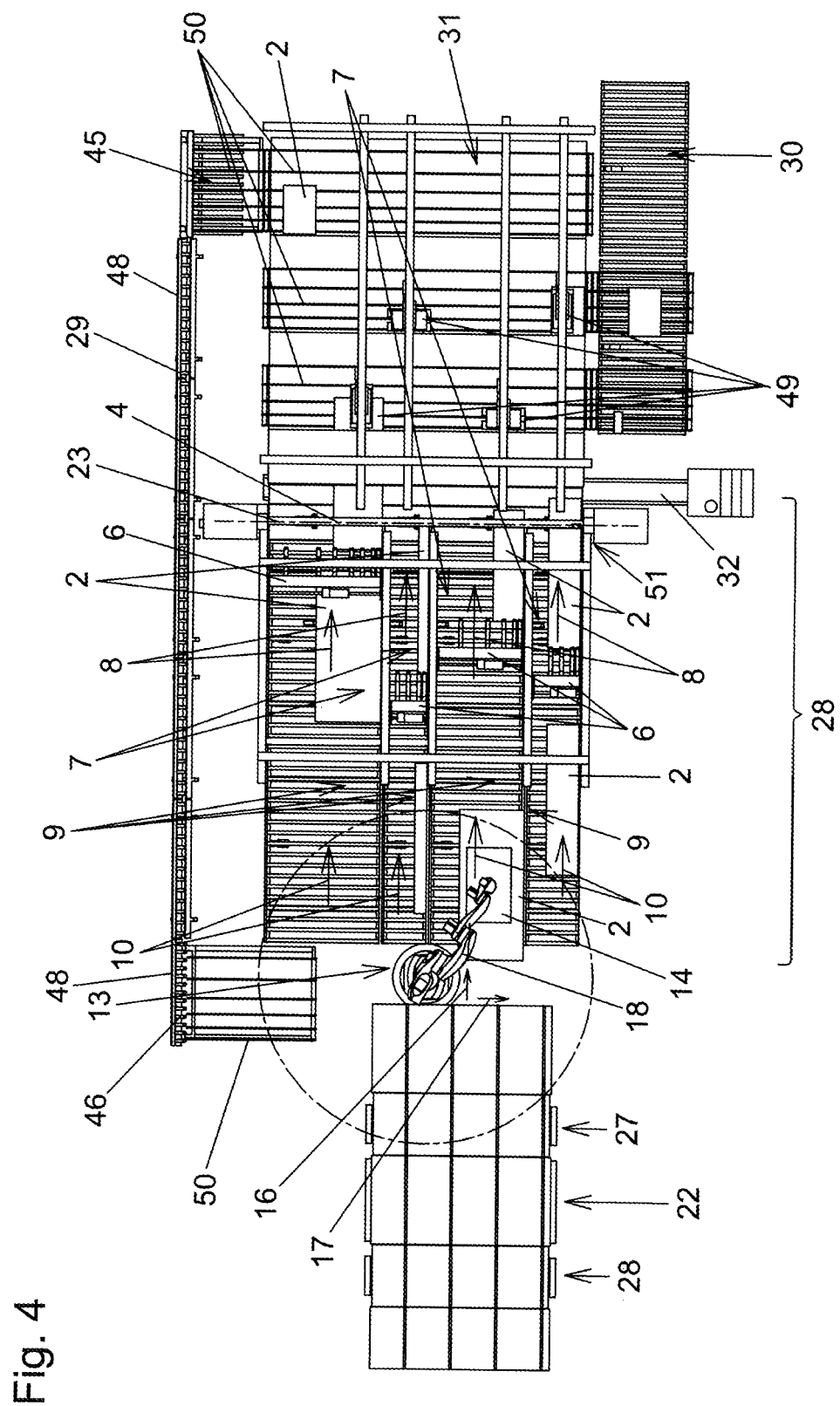
FIG. 4 is a plan view of FIG. 3.

When the panel dividing system 1 is in operation, the workpieces 2 are supplied independently of each other by means of the respective supply devices 9 to the work areas 7 of the feed devices 6 assigned the respective supply devices 9. It is preferably provided that at the same time a different workpiece 2 is fed from the respective feed devices 6 to the sawing line 4 for sawing. Put simply, the supply devices 9 thus ensure the required replenishment of workpieces 2 while the feed devices 6 are still used to saw the previous workpieces 2 in the respective work areas 7 along the sawing line 4. This situation is shown particularly well by way of example in the plan view according to FIG. 4. The workpieces 2 currently to be sawed are supplied to the work areas 7 of the sawing line 4 for sawing. The feed devices 6 can work completely independently of each other. It is preferably provided that during each sawing operation along the sawing line 4, in all work areas 7 there are workpieces 2 which are sawn during this sawing operation. FIG. 4 also shows that, depending on the work progress in the given work area 7, the respectively assigned supply devices 9 can already deliver further workpieces 2, such that each feed device 6, when the previous workpiece 2 has been completely sawn, already has in its work area 7 the next workpiece 2, which has already been supplied by the given supply device 9, grasps it, and can immediately feed it to the sawing line 4 for further sawing.

Figure 3:
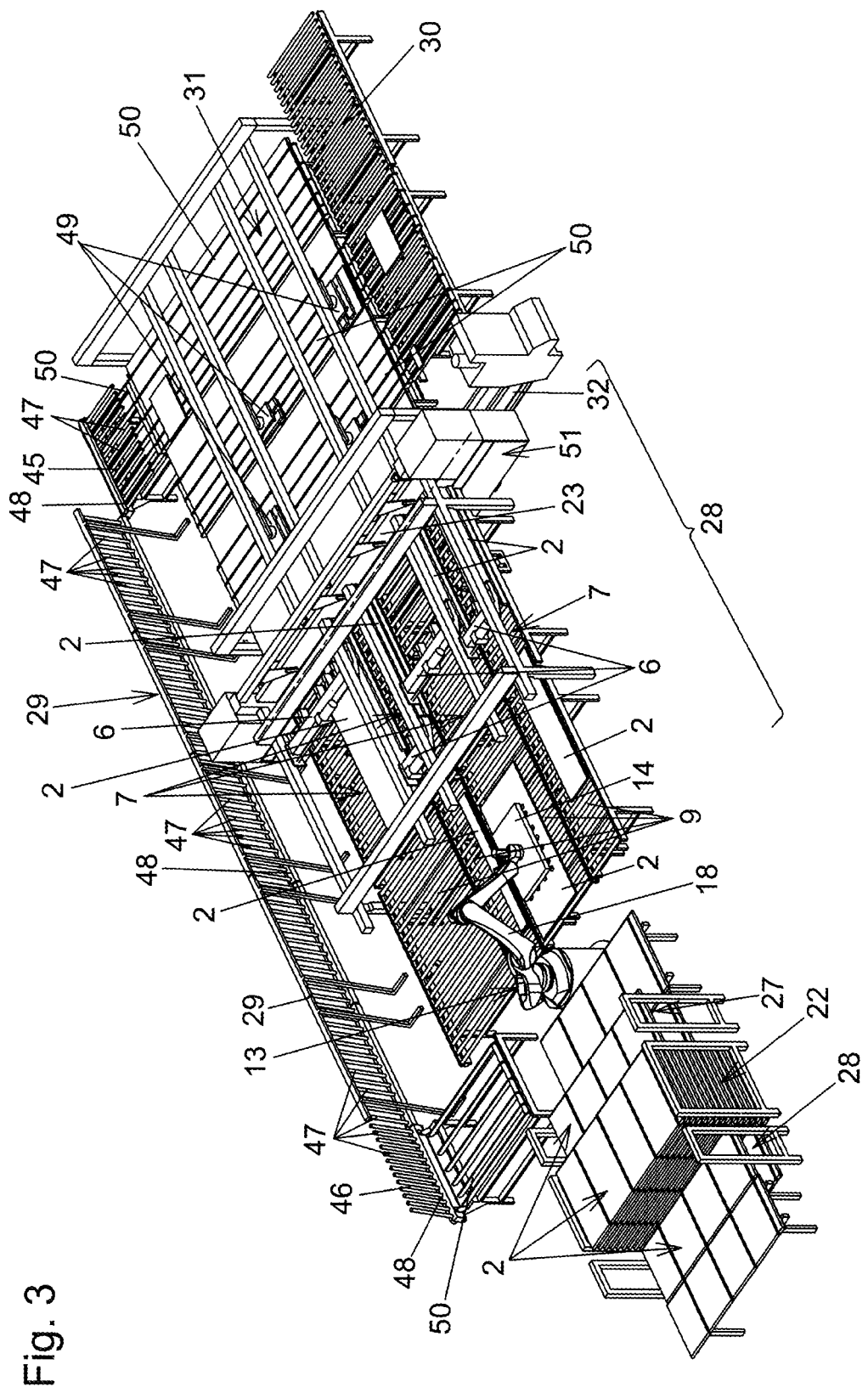
FIG. 3 is an enlarged perspective view of the area of the panel dividing system from FIGS. 1 and 2, in which the core ideas of the invention are implemented.

The workpieces 2 are supplied to the respective supply devices 9 in preferred embodiments, such as the one shown here, by means of a lifting device 13, which is suitable for lifting workpieces 2 towards the supply device 9 and lowering them again from above—in this case, onto the respective supply devices 9. To this end, the lifting device 13 removes the workpieces 2 from the removal device 27 of the storage device 22 and places them on the given supply device 9. In the first embodiment, the lifting device 13, as can be seen in FIGS. 3 and 4, is designed in the form of a robot. It has a robot arm 18 on which a workpiece holding device 14 is arranged for holding the workpieces 2. The workpiece holding devices 14 can be, by way of example, suction devices known per se, which attach the workpieces 2 by suction for transport. They can also be gripping devices which grip the workpieces 2 from the side. This is also known per se. In this embodiment, the workpiece holding device 14 can be moved both in the vertical spatial direction 15 and in the two horizontal spatial directions 16 and 17 by means of the robot arm 18. In principle, however, embodiments are also conceivable in which the workpiece holding device 14 can only be moved in the vertical spatial direction 15 and in one horizontal spatial direction 16. The lifting device 13 is advantageously designed in such a way that it can also be used to rotate the workpiece 2 attached to the workpiece holding device 14 about a vertical axis, in order to be able to supply it to the respective supply devices 9 in the desired orientation. The lifting device 13 thus makes it possible to supply the required and/or provided workpieces 2 to the respective supply devices 9 in the orientation intended in each case.

In this embodiment, behind the sawing station 51 with the sawing line 4, there is a waste disposal device 32, in which, as is known per se, pieces of waste that are no longer required during the sawing processes are disposed of. A corresponding shredding device for the waste can be integrated into the waste disposal device 32. This is followed by a sorting station 31 in the embodiment shown here. In this embodiment, this has lifting devices 49 and conveyor belts 50 for the workpieces 2. If the workpieces 2 are final formats, they are conveyed to the discharge area 30 in the sorting station 31 by means of the corresponding lifting devices 49 and conveyor belts 50. If, on the other hand, the workpieces 2 in the sorting station 31 are formats that have to be sawn even further, for example by means of third or fourth cuts, these are conveyed back in preferred embodiments, such as the one shown here, by means of a return device 29 from the region behind the sawing line 4 into the region in front of the sawing line 4. Such return devices 29 are known per se in many different forms. As in this example, they may be roller conveyors leading around the sawing line 4. It is just as conceivable to use known lifting devices, such as gantry cranes or robots, as return devices, in order to convey these workpieces 2 which must be returned past the sawing line 4 and back into the region in front of the sawing line 4. In the case of conveyor belts or roller conveyors leading around the sawing line 4, these are generally designed to be horizontal, such that the workpieces 2 are conveyed lying horizontally on them. This is different in the embodiment shown here. In this embodiment, to save space, the roller conveyor with the rollers 47 forming the return device 29 is set at an angle, such that the workpieces 2 which must be returned are set at an angle and conveyed back on it. In preferred embodiments, the rollers 47 are set with their longitudinal direction at an angle between 5° and 20° to the vertical. If the workpieces are lying on the rollers 47, their narrow sides stand on conveyor belts 48 of the return device 29, which ensure that the workpieces 2 are transported back into the region in front of the sawing line 4. This process of positioning the workpieces 2 and/or of holding the workpieces 2 in the return device 29 takes place on the workpiece receiving platform 45. In this case, the rollers 47 are designed to be able to tilt back and forth between the horizontal orientation shown in FIGS. 1 to 4 and the correspondingly upright orientation. In the horizontal position shown in the figures, the workpieces 2 being returned can be pushed from the sorting station 31 via the corresponding conveyor belts 50 onto the rollers 47 of the workpiece receiving platform 45. After the workpiece receiving platform 45 has been tilted up, the workpieces 2 are transported back past the sawing line 4 and then tilted back down to the horizontal by means of the workpiece discharge platform 46. There, they can be moved again by the conveyor belt 50 present there into the work area of the lifting device 13 in order to be supplied there again to one of the supply devices 9 by the lifting device 13 at the appropriate time. For this purpose, the workpiece discharge platform 46 can be designed in the same way as the workpiece receiving platform 45.

FIGS. 5 and 6 show side views of the processing station 28. The lifting device 13 with which the workpieces 2 can be supplied to the supply device 9 can be seen. As can be seen clearly in FIGS. 5 and 6, the supply device 9 in this embodiment is a conveyor track 52—in this case specifically, a driven roller conveyor. The drive takes place in a manner known per se by means of the drive motors 53. In the embodiment shown here, the two-part supply devices 9 extend very far into the respective work areas 7, almost to the sawing line 4. Of course, this can be formed differently as well. It is only important that the supply devices 9 are designed in such a way that they can transport the workpieces 2 in the transport direction 10 into the work areas 7 of the respectively assigned feed devices 6, such that each feed device 6 then grips the supplied workpiece 2 in the work area 7 by means of its gripper 12, and can continue to supply it to the sawing line 4 in the feed direction 8. The transport directions 10 and the feed directions 8 are expediently, as also shown, arranged parallel to each other. FIG. 5 shows how a workpiece 2 is fed to the supply device 9 by means of the lifting device 13, while a workpiece 2, which has already been moved into the work area 7 by means of the supply device 9, is being gripped by the gripper 12 of the associated feed device 6, and is being moved against a stop 75 in front of the sawing line 4. By means of this stop 75, the position of the front end of the workpiece 2 can be determined very precisely, such that after the stop 75 has been lowered below the support plane of the workpiece support table 3, the workpiece 2 can then be accordingly positioned precisely on the sawing line 4 by means of the feed device 6 in the feed direction 8, to carry out the sawing processes along the sawing line 4. Instead of the stop 75 which can be raised and lowered, optical or mechanical measuring devices can also be provided in order to determine the exact position of the front end of the workpiece 2 in front of the sawing line 4. In the case of optical measuring devices, by way of example, these can be light barriers or camera systems. Mechanical measuring devices are, by way of example, measuring fingers or measuring buttons, which are lowered, for example, into the workpiece support plane of the workpiece support table 3 when the workpiece 2 moves past them, and emit a signal that the front end of the workpiece 2 has hit them. When a stop 75 is used, the workpiece 2 is briefly halted when it hits the stop 75; in contrast, with optical or mechanical measuring systems, the position of the front end of the workpiece 2 can be determined during its passage—that is, without halting the workpiece 2.

The portion of the supply device 9 and/or conveyor track 52 located in the work area 7 in this embodiment advantageously has a freewheel which can be activated when the workpiece 2 is transported in the feed direction 8 by the feed device 6. In this way, the frictional resistance on the workpiece 2 can be kept as low as possible.

FIG. 6 also shows how the workpiece 2 deposited by the lifting device 13 on the supply device 9 is conveyed into the work area 7 of the feed device 6, while the previous workpiece 2, still attached to the feed device 6, is fed to the sawing line 4 for sawing. With the invention, a sufficient number of workpieces 2 is therefore always available on the sawing line 4, such that the cutting saw 5 can carry out sawing processes with as little interruption as possible along the sawing line 4.

The structure of the sawing station 51, known per se, is also shown schematically in FIGS. 5 and 6. In this embodiment, the cutting saw 5 is designed in the form of a circular saw blade, and can be raised and lowered in the saw carriage 54. The same applies to the scoring saw blade 57, which may optionally be present upstream of the cutting saw 5 and is not shown here in these figures. The cutting saw 5 can likewise be moved along the sawing line 4, for example in a saw carriage 54 to carry out the sawing processes. The pressure beam device 23, which can be designed in the known manner, is provided to press the workpiece 2 onto the workpiece support table 3 in the region of the sawing line 4 during the sawing process.

FIGS. 7 to 9 show various embodiments of how the pressure beam device 23 can be implemented, by way of example. In FIGS. 7 to 9, schematized illustrations of the region of the sorting station 31 are shown in a viewing direction opposite the feed direction 8. The pressure beam device 23 in all three design variants has pressure beam uprights 56 which are known per se. In the variant according to FIG. 5, a continuous pressure beam 55 is arranged on these in a manner allowing it to be raised and lowered. It can press the workpieces 2 lying on the sawing line 4 and/or the workpiece support table 3 in the lowered state onto the workpiece support table 3. In the raised state of the pressure beam 55, the workpieces 2 arranged in the respective work areas 7 can be pushed further by the respective feed devices 6 in the respective feed directions 8, in such a manner that they can be positioned precisely on the sawing line 4 for the next cut.

Also clearly visible in FIGS. 7, 8 and 9 are the stop rails 20 which run parallel to the feed directions 8 and which, in this embodiment, delimit the work areas 7 of the feed device 6 from each other laterally. In addition, the stop rails 20 serve to align the workpieces 2. For this purpose, the respective alignment devices 21 in the respective work areas 7 can press the workpieces 2 against the respective stop rails 20, as is known per se.

While in FIG. 7 a continuous pressure beam 55 is provided for all work areas 7, FIG. 8 shows a variant in which the pressure beam is divided into pressure beam segments 24 that can be raised and lowered independently of each other. In the embodiment according to FIG. 8, each work area 7 is assigned its own pressure beam segment 24. This further increases the flexibility of the system, since according to FIG. 8, each of the pressure beam segments 24 only has to be lowered to press the workpiece 2 arranged in the given work area 7 while this workpiece 2 is actually being sawed. Before and after that, the given pressure beam segment 24 can already be raised in order to transport and position the given workpiece 2 in the given work area 7 for the next cut by means of the given feed device 6.

FIG. 9 now shows, by way of an example, that it is not absolutely necessary for there to be only one cutting saw 5 per sawing line 4. FIG. 9 shows that several, in FIG. 9 two, cutting saws 5 can also be arranged to be movable along the sawing line 4. In the case of these variants, the cutting saws 5 which can be moved along the sawing line 4 are preferably not coupled to each other. As such, they can be moved independently of each other as long as they don't collide with each other. This also further increases the flexibility of the system. In FIGS. 7 to 9, the scoring saw blades 57 arranged in each case together with the cutting saw 5 in each of the saw carriages 54 can also be seen. In FIG. 9, there is again a continuous pressure beam 55 for all work areas 7. However, it can just as well be provided that in FIG. 9 each work area 7 is assigned its own pressure beam segment 24, as is illustrated in FIG. 8.

Figure 10:
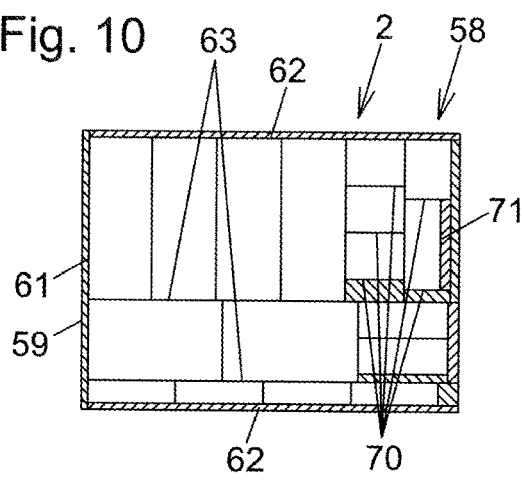
FIGS. 10 and 11 show a workpiece and a cutting plan projected thereon.

FIG. 10 now shows, by way of example, a first cutting plan 58, shown projected onto a workpiece 2, according to the specifications of which the workpiece 2 can be trimmed and sawed with the panel dividing system 1 according to the invention. The workpiece 2 can be either a single panel or a stack of panels. It may be raw panels, or panels that have already been processed. In order to carry out the cutting plan 58, the workpiece 2 is deposited by the lifting device 34, from the workpiece buffer 33, in the desired orientation on the workpiece support table 38 of the first processing station 25, and is gripped there by the first feed device 36 by means of the gripper 39. When the workpiece 2 is moved towards the sawing station 41, the common edge 59 is first separated from the workpiece 2 along the edge line 61 at the trimming station 40. It is preferably provided in this case that the common edge 59 is completely broken up into dust and chips, so that it can be removed by a suction device of the trimming station 40, which is not shown here. Alternatively, the trimming station 40 can of course also be designed in such a way that residual waste strips can arise during the trimming process, which are then disposed of, and preferably shredded, in the trimming station 40 after being separated. In the embodiment shown here, the workpiece 2 is pushed past the trimming station 40 by means of the first feed device 36 during the trimming process. Alternatively, it is also conceivable to design the trimming station 40 in such a way that the trimming tool is guided along the workpiece 2, which is at rest at this moment, in order to separate the common edge 59 along the edge line 61.

Figure 11:
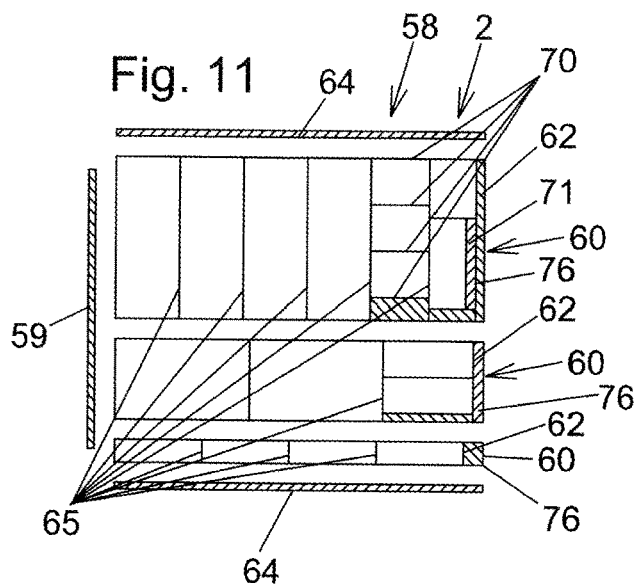

After the common edge 59 is cut off, the first feed device 36 pushes the workpiece 2 far enough over the sawing line 44 that the first other edge 64 can be separated on the sawing line 44 along the other edge line 62 that runs parallel to the first cutting lines 63. The separated, other edge 64 is disposed of in the waste disposal device 42. The workpiece 2 is then pushed far beyond the sawing line 44, such that the cuts along the first cutting lines 63 and then also along the other rear edge line 62 parallel to the first cutting lines 63 can be made along the sawing line 44. The lowering of the pressure beam 43 to carry out the sawing processes, and the subsequent lifting for the further transport of the workpiece 2, can be carried out in a manner known per se. It is preferably provided that during one of the sawing processes on the first cutting lines 63 or the other parallel edge lines 62, the first feed device 36 releases the workpiece 2 and the second feed device 37 grips the workpiece 2 with its grippers 39, such that the feed for the further sawing processes along the first cutting lines 63 and the other parallel edge lines 62 can be implemented by means of the second feed device 37, while the first feed device 36 is already moving back in order to pick up the next workpiece 2. After completion of these sawing processes along the first cutting lines 63 and the other parallel edge lines 62, and the disposal of the other rear edge 64, the workpiece 2 is sawn into the strips 60 as shown in FIG. 11. The strips 60 are then stocked in the storage device 22 by means of the stocking device 26, and can then be removed again from the storage device 22 by means of the removal device 27 at the appropriate point in time. These strips 60 are then fed as workpieces 2 to the corresponding supply devices 9 by means of the lifting device 13. The strips 60 and/or workpieces 2 are advantageously aligned in this case in such a way that their already trimmed side, on which the common edge 59 was separated, point in the direction of the sawing line 4 of the processing station 28. However, an arrangement the other way around is also possible. Should it be necessary to rotate the strips 60 and/or workpieces 2 for their desired alignment on the supply devices 9, this can be done by means of the lifting device 13. The strips 60 and/or workpieces 2 are then fed independently of each other to the work areas 7 of the feed devices 6 by means of the supply devices 9, are taken over by the feed devices 6, and are fed to the sawing line 4 for the sawing processes along the second cutting lines 65 and the other parallel edge lines 62. In this case, several strips 60 and/or workpieces 2 arranged next to each other in the work areas 7 are fed independently of each other to the sawing line 4 by means of the corresponding feed device 6. It is optimal if, during a sawing process, there are workpieces 2 and/or strips 60 in all work areas 7 along the sawing line 4, and are sawn during this sawing process. Waste pieces, such as the other edges 76 still present on the respective strips 60, can then be disposed of in the waste disposal device 32 at the appropriate time. The formats and/or workpieces 2 resulting from the sawing of the strips 60 along the second cutting lines 65 are then conveyed in the sorting station 31 into the discharge area 30, if they are final formats. If cuts along the third cutting lines 70 have to be carried out on the parts and/or workpieces 2 created in the course of sawing along the second cutting line 65, these formats and/or workpieces 2 are conveyed back by the return device 29 to the region in front of the sawing line 4, and are supplied at the appropriate time back to one of the supply devices 9 by the lifting device 13, in order to be able to carry out the third cuts on the sawing line 4 that are still required. The same then applies when fourth cuts along the fourth cutting lines 71 are necessary.

Figure 12:
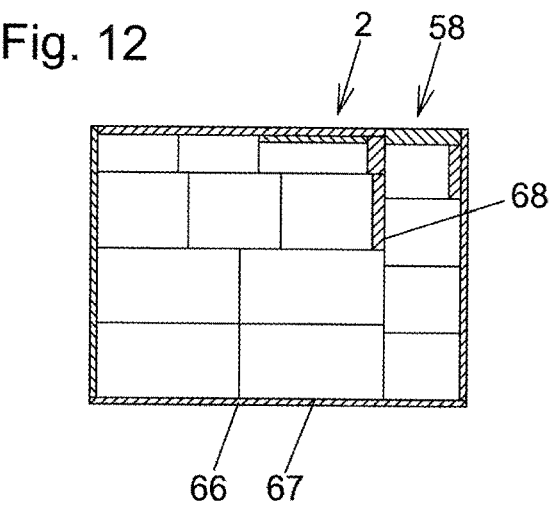
FIGS. 12 to 15 are illustrations of a second workpiece with a cutting plan projected thereon.
Figure 13:
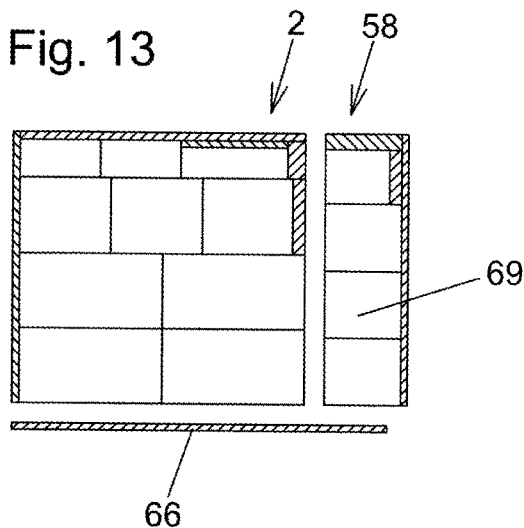
Figure 14:
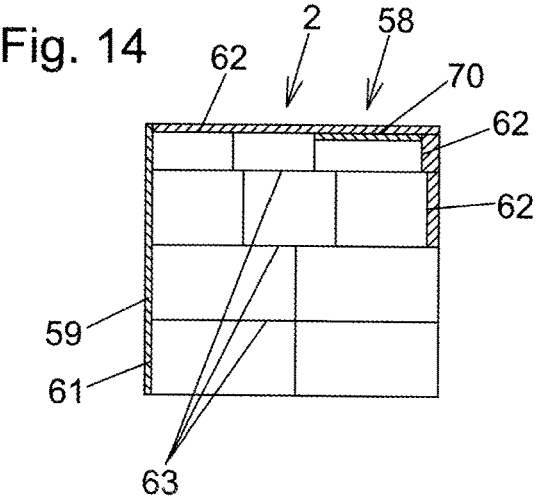
Figure 15:
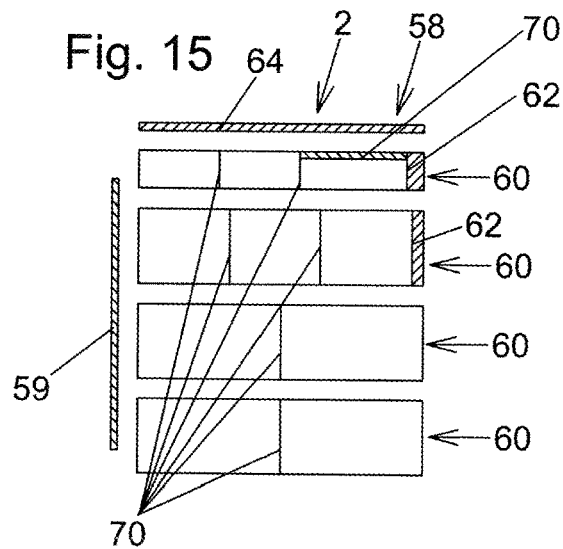

FIG. 12 shows, by way of example, another cutting plan 58 projected onto a workpiece 2, in which a first edge 66 must be separated along the first edge line 67, and then a head part 69 must be separated along the head cutting line 68 from the workpiece 2. This is preferably carried out in the upstream processing station 25. For this purpose, the workpiece 2 is deposited by the lifting device 34, again from the workpiece buffer 33, on the workpiece support table 38, and is gripped there by the first feed device 36 by means of the gripper 39. During the feed in the direction of the sawing line 44 and/or the sawing station 41, the first edge 66 is cut off along the first edge line 67 by means of the trimming station 40. To this end, there are again all the possibilities as described above with regard to the separation of the common edge 59 from the workpiece from FIG. 10. After the first edge 66 is cut off, the workpiece 2 is pushed by the first feed device 36 over the sawing line 44 in such a way that, after the pressure beam 43 has been lowered accordingly, the sawing process is carried out along the head cutting line 68, and the head part 69 is thus separated from the workpiece 2. As is known per se in the prior art, the further sawing of the head part 69 can be carried out in a suitable manner, without any further explanation being required here. The workpiece 2 remaining after the separation of the first edge 66 and the head part 69 is shown in FIG. 14. It is now initially withdrawn a little from the sawing line 44 by the first feed device 36, and rotated by 90° about a vertical axis. This turning can be carried out by means of the lifting device 34 or by means of a turning device, which is not shown here, integrated into the workpiece support table 38. The first feed device 36 then grips the workpiece 2 and pushes it past the trimming station 40, wherein the common edge 59 is then separated along the edge line 61 before the sawing along the first cutting lines 63 and the other parallel edge line 62 takes place on the sawing line 44 analogously to the procedure outlined with respect to FIGS. 10 and 11. The resulting strips 60 and/or workpieces 2 shown in FIG. 15 are again temporarily stored in the storage device 22, and then further divided according to the invention in the processing station 28, analogously to the example of FIG. 11. The same applies to the third cuts along the third cutting lines 70 that may still have to be performed.

With the panel dividing system designed according to the invention, a very high degree of efficiency is achieved when dividing the workpieces 2. The aim is to utilize the processing stations 25 and 28 as optimally as possible, to achieve the least possible downtime. It is expedient in this case to always have the greatest possible number of workpieces 2 ready in the storage device 22, in order to be able to process them in the processing station 28 according to the invention with as little interruption as possible. This is shown in FIG. 16. There, the degree of filling z of the storage device 22 is shown as a function of time t. It can be seen that a very high degree of filling z is permanently ensured, and thus there is always a sufficient number of workpieces 2 in the storage device 22.

Figure 20:
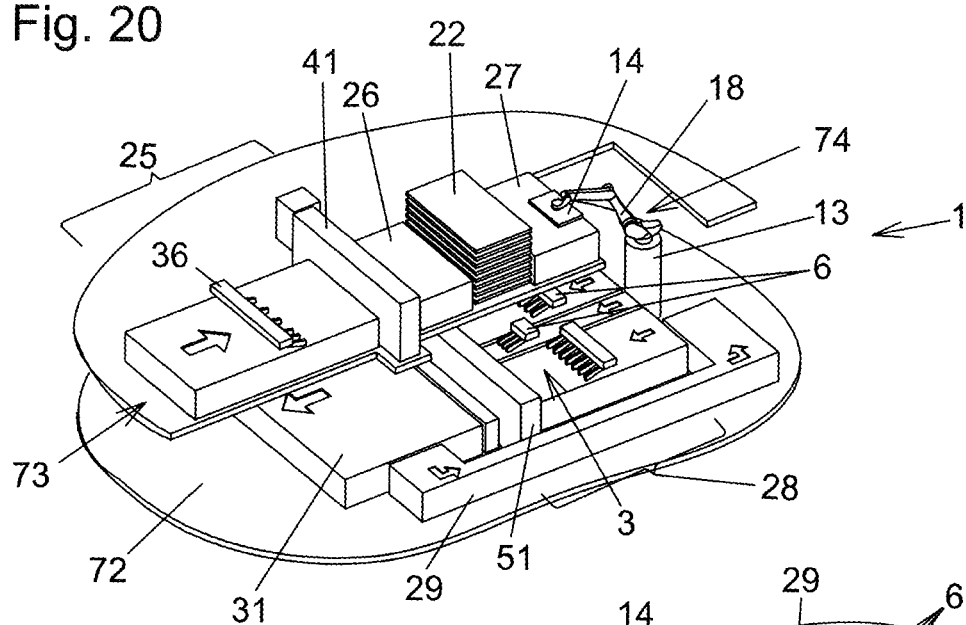
Figure 21:
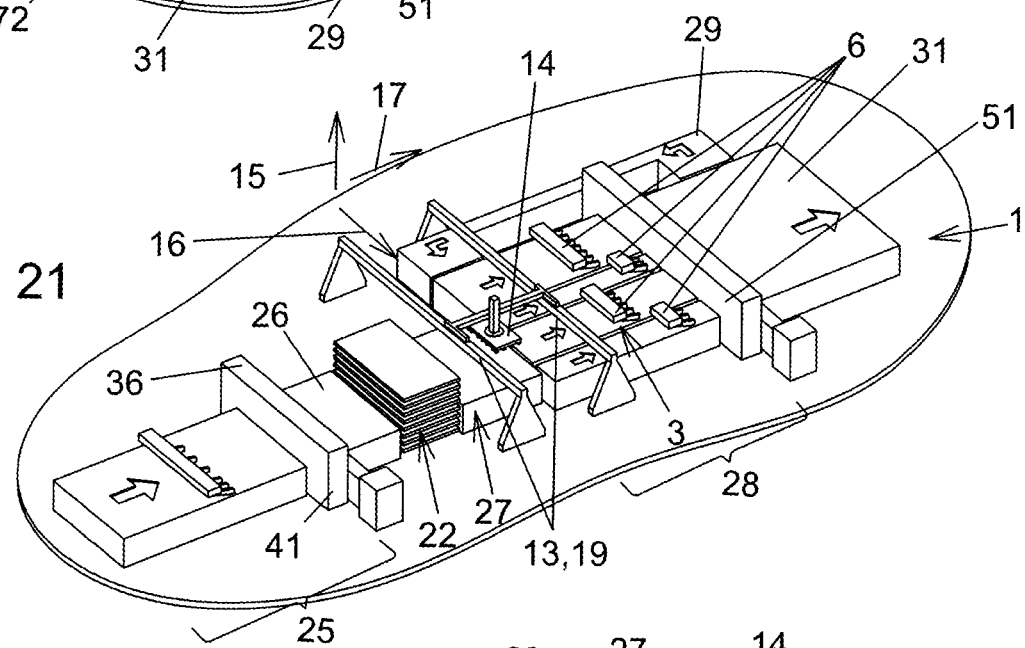
Figure 22:
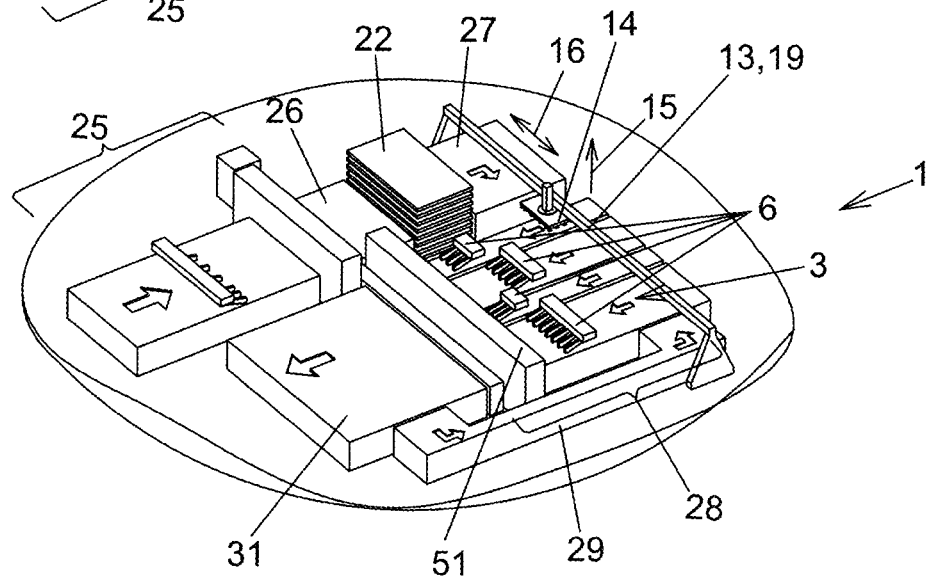

In FIG. 17, the panel dividing system 1, which has already been discussed and shown in the previous figures, is shown once again in a schematic manner, although only one feed device 36 is shown in the processing station 25. FIGS. 18 to 22 illustrate, in a correspondingly highly schematic manner, variants of how the processing stations 25 and 28 of the previously described panel dividing system 1 can be arranged in a different manner. In FIG. 18 there is an L-shaped arrangement in plan view. In FIG. 19, there is a U-shaped arrangement. In FIG. 20, the panel dividing system is arranged in two levels 72 and 73 arranged one above the other. The upstream processing station 25 is on the upper level 72 together with the storage unit 22 and its storage and removal device 26 and 27. The processing station 28 with the sorting station 31 is arranged in the level 72 below. The lifting device 13 removes the workpieces to be processed by means of the processing station 28 from the removal device 27 of the storage device 22 on the upper level 73, and guides them through the ceiling opening 74 to the supply devices 9 of the processing station 28 located on the lower level 72. With the exception of the type of lifting device 13, the panel dividing system 1 in FIG. 21 is designed like the embodiment according to FIG. 17. In FIG. 21, however, the lifting device 13 is designed as a gantry crane 19 with which the workpiece holding device 14 can be moved in three spatial directions 15, 16, 17. A rotating device is also expediently incorporated into the workpiece holding device 14 according to FIG. 21. FIG. 22 shows a modification of FIG. 19. A lifting device 13 in the form of a gantry crane 19 is also provided in this case. In this case, the workpiece holding device 14 can only be moved in the vertical spatial direction 15 and in one horizontal spatial direction 16.

With the exception of the differences mentioned, what is described in connection with FIGS. 1 to 17 applies to the panel dividing systems according to FIGS. 18 to 22.

LIST OF REFERENCE NUMBERS 1 panel dividing system
2 workpiece
3 workpiece support table
4 sawing line
5 cutting saw
6 feed device
7 work area
8 feed direction
9 supply device
10 transport direction
11 carrier
12 gripper
13 lifting device
14 workpiece holding device
15 vertical spatial direction
16 horizontal spatial direction
17 horizontal spatial direction
18 robot arm
19 gantry crane
20 stop rail
21 alignment device
22 storage device
23 pressure beam device
24 pressure beam segment
25 processing station
26 stocking device
27 removal device
28 processing station
29 return device
30 discharge area
31 sorting station
32 waste disposal device
33 workpiece buffer
34 lifting device
35 workpiece holding device
36 first feed device
37 second feed device
38 workpiece support table
39 gripper
40 trimming station
41 sawing station
42 waste disposal device
43 pressure beam
44 sawing line
45 workpiece receiving platform
46 workpiece discharge platform
47 roller
48 conveyor belt
49 lifting device
50 conveyor belt
51 sawing station
52 conveyor track
53 drive motor
54 saw carriage
55 pressure beam
56 pressure beam upright
57 scoring saw blade
58 cutting plan
59 common edge
60 strip
61 edge line
62 other edge line
63 first cutting line
64 other edge
65 second cutting line
66 first edge
67 first edge line
68 head cutting line
69 head part
70 third cutting line
71 fourth cutting line
72 level
73 level
74 ceiling opening
75 stop

The invention claimed is:

1. A panel dividing system for sawing workpieces consisting of a panel or a stack of panels, the panel dividing system comprising:
a workpiece support table and a sawing line;
a cutting saw which is movable along the sawing line;
two or more independently movable feed devices for moving the workpieces lying on the workpiece support table, each of the feed devices having a work area whereby the panel dividing system comprises a plurality of work areas, wherein the work areas of the feed devices are formed next to each other on the workpiece support table, and the feed directions of the feed devices run parallel to each other; and a stop rail arranged at least in some regions between respective ones of two mutually adjacent of the work areas on the workpiece support table, wherein the feed devices are each assigned a separate one of the work areas in which a respective one of the workpieces is movable by a respective one of the feed devices in a respective feed direction towards the sawing line, wherein each of the feed devices is assigned a supply device of the panel dividing system, wherein each of the supply devices are structured to transport at least one of the workpieces into the work area of the feed device to which the supply device is assigned, wherein the work areas of the feed devices are separate from each other, and wherein at least one of the work areas is assigned an alignment device for aligning the respective workpieces orthogonal to the given feed direction, the alignment device being configured to press workpieces in the respective work area, which have a width smaller than the width of the respective work area, against the stop rail.

2. The panel dividing system according to claim 1, wherein the work areas of the feed devices are each formed between the sawing line and the supply device assigned to the respective one of the feed devices, and/or in that each of the supply devices transports at least one of the workpieces in a transport direction of the respective supply device into the work area of the feed device to which the supply device is assigned, and the respective transport directions of the supply devices run parallel to the feed directions of the feed devices.

3. The panel dividing system according to claim 1, wherein each of the feed devices has a carrier which extends orthogonally to the feed direction of the feed device and which is movable in the feed direction of the feed device, said carrier having at least one gripper which is raised and lowered for gripping one of the workpieces, and/or in that the supply devices are each designed as driven conveyor tracks on each of which at least one of the workpieces is transportable lying down.

4. The panel dividing system according to claim 3, wherein the driven conveyor tracks are driven roller tracks.

5. The panel dividing system according to claim 1, further comprising:
a lifting device for supplying the respective workpiece to the respective supply device from above, and for depositing the respective workpiece at the respective supply device.

6. The panel dividing system according to claim 5, wherein the lifting device (13) has a workpiece holding device for holding the workpieces, the workpiece holding device being movable in a vertical spatial direction and in at least one horizontal spatial direction.

7. The panel dividing system according to claim 6, wherein the lifting device further has a robot arm which is movable in the spatial directions, and on which the workpiece holding device is arranged, or in that the lifting device has a gantry crane for moving the workpiece holding device in the spatial directions.

8. The panel dividing system according to claim 5, further having a storage device for storing the workpieces, from which the workpieces are removable.

9. The panel dividing system according to claim 8, wherein the storage device has a sorting function, on the basis of which the workpieces are removed from the storage device, regardless of the order in which they are stored.

10. The panel dividing system according to claim 8, wherein the workpieces are removable from the storage device by the lifting device.

11. The panel dividing system according to claim 1, wherein the sawing line is assigned a pressure beam device with several pressure beam segments that are operated independently of each other and that are each assigned to at least one of the work areas, for the purpose of pressing at least one of the workpieces on the workpiece support table.

12. The panel dividing system according to claim 1, further having at least two of the cutting saws which are movable along the sawing line.

13. The panel dividing system according to claim 12, wherein the at least two cutting saws are movable independently of each other along the sawing line.

14. The panel dividing system according to claim 1, further having at least one upstream processing station for sawing and/or trimming the workpieces before the workpieces are supplied to the supply devices.

15. The panel dividing system according to claim 1, further comprising supplying a first workpiece by means of a supply device to the work area of one of the feed devices assigned to the supply device, while a second workpiece is being supplied by another one of the feed devices to the sawing line for sawing.

16. The panel dividing system according to claim 15, further comprising a plurality of work areas and wherein, during a sawing process along the sawing line, workpieces are assigned to all of the work areas along the sawing line, which workpieces are sawn during the sawing process.

17. The panel dividing system according to claim 1:
further comprising at least two stop rails delimiting at least one of the work areas in a lateral direction, thereby defining a maximum width of the respective work area,
wherein the respective work area is assigned the alignment device for aligning the respective workpieces orthogonal to the given feed direction, thereby allowing workpieces with different widths to be aligned in the respective work area.

* * * * *